United States Patent [19]

Derner et al.

[11] Patent Number: 4,516,997
[45] Date of Patent: May 14, 1985

[54] METHOD OF AND APPARATUS FOR VACUUM SHAPING A GLASS SHEET

[75] Inventors: Paul Derner, Gelsenkirchen; Rüdolf Eckardt; Hans-Christoph Neuendorf, both of Wesel, all of Fed. Rep. of Germany

[73] Assignee: Flachglas Aktiengesellschaft, Fürth, Fed. Rep. of Germany

[21] Appl. No.: 538,579

[22] Filed: Oct. 3, 1983

[30] Foreign Application Priority Data

Oct. 1, 1982 [DE] Fed. Rep. of Germany ....... 3236400
Jan. 7, 1983 [DE] Fed. Rep. of Germany ....... 3300388

[51] Int. Cl.³ .......................................... C03B 23/035
[52] U.S. Cl. ...................................... 65/106; 65/273; 65/287; 65/291
[58] Field of Search ................. 65/106, 273, 287, 290, 65/291

[56] References Cited

U.S. PATENT DOCUMENTS 4,229,200 10/1980 Seymour .............................. 65/106
4,277,276 7/1981 Kellar ............................... 65/291 X

FOREIGN PATENT DOCUMENTS

K22178   5/1956  Fed. Rep. of Germany .
1010245  11/1957 Fed. Rep. of Germany .
2119699  9/1978  Fed. Rep. of Germany .
3109149  12/1981 Fed. Rep. of Germany .
3113410  11/1982 Fed. Rep. of Germany .
3113409  11/1982 Fed. Rep. of Germany .

Primary Examiner—Arthur Kellogg
Attorney, Agent, or Firm—Karl F. Ross; Herbert Dubno

[57] ABSTRACT

A method of deforming a plastic glass sheet from a generally two-dimensional shape into a generally three-dimensional shape at first supports the plastic glass sheet with its two-dimensional upper face juxtaposed underneath the three-dimensional lower face of a vacuum-forming die. The sheet and die are then relatively displaced vertically toward each other so that one portion of the sheet face engages a respective portion of the die face. The two portions are secured together by suction so that the sheet adheres at the one portion of its face to the respective portion of the die face. Finally, the sheet and die are relatively displaced with deformation of the sheet to press the rest of the sheet face and die face together and adhere the faces entirely together by suction. The sheet is supported on a planar conveyor that is rocked about a horizontal axis to engage the faces together. This conveyor and the die can be relatively rocked about a horizontal axis, or even about two transverse horizontal axes.

19 Claims, 8 Drawing Figures

METHOD OF AND APPARATUS FOR VACUUM SHAPING A GLASS SHEET

FIELD OF THE INVENTION

The present invention relates to the shaping of a planar glass sheet into a three-dimensional shape. More particularly this invention concerns a vacuum-shaping operation that uses a deep-drawing die.

BACKGROUND OF THE INVENTION

It is standard practice to deform a semifinished sheet of glass while it is still very hot and somewhat plastic from its invariably substantially two-dimensional planar shape into a more complex three-dimensional shape. This procedure must be carried out while avoiding point stress which would mar the workpiece so that portions of it would be weakened and form optical distortions.

It is possible as suggested in German Pat. No. 1,010,245 to simply press a flat plastic sheet workpiece between two matching nonplanar dies, but such a procedure invariably mars the surfaces of the workpieces and therefore cannot be used for high-quality glass items. Hence suction is used to hold the workpiece on the forming die, as this style of holding is extremely gentle, the holding force being spread perfectly uniformly over the entire surface of the face of the sheet. Thus the surface of the workpiece will normally remain perfectly smooth, and the workpiece thickness will remain perfectly uniform, giving it good optical properties.

German patent document No. 3,109,149 describes a vacuum die that is used for this purpose. It has a face formed as a plurality of adjacent and outwardly open recesses or cells defining compartments opening at the face. These compartments can be individually evacuated. In addition the entire mold can be deformed from a start position in which the face of the mold is substantially planar to a finish position in which the face has the shape that is to be imparted to the workpiece.

Thus the die in the start position is applied normally down against the planar top face of the workpiece, which is held in a forming station on a conveyor, and the compartments are evacuated. This action pulls the glass sheet into tight contact with the still planar die face. Then the die is lifted to pick the workpiece up off the conveyor, and is deformed into the finish position, drawing the workpiece into the desired shape. The glass is given some time to harden in this finish position, then the vacuum is cut and the workpiece is freed from the die, which is then returned to its start position for another shaping operation.

Such dies can work on several workpieces at the same time, in which case they must normally be subdivided transversely as well as longitudinally into separate compartments. Thus the loss of suction at the gap between adjacent workpieces will not cause one of them to be dropped.

The main problem with such an apparatus and method is that the die is an extremely complex piece of equipment and is very hard to control accurately. It is in fact impossible to form certain shapes as the die cannot physically be deformed from the planar start position into some shapes. In addition in some arrangements the workpiece is stretched at the joints between adjacent relatively movable die portions, creating weakened regions that form optical distortions.

OBJECTS OF THE INVENTION

It is therefore an object of the present invention to provide an improved system for shaping a glass sheet.

Another object is the provision of such a system for shaping a glass sheet which overcomes the above-given disadvantages, that is which uses relatively simple equipment that operates in a simple manner, and that can nonetheless produce very complex shapes.

SUMMARY OF THE INVENTION

A method of deforming a plastic glass sheet from a generally two-dimensional shape into a generally three-dimensional shape according to the invention at first supports the plastic glass sheet with its two-dimensional upper face juxtaposed underneath the three-dimensional lower face of a vacuum-forming die. The sheet and die are then relatively displaced vertically toward each other so that one portion of the sheet face engages a respective portion of the die face. The two portions are secured together by suction so that the sheet adheres at the one portion of its face to the respective portion of the die face. Finally, the sheet and die are relatively displaced with deformation of the sheet to press the rest of the sheet face and die face together and adhere the faces entirely together by suction.

This can be achieved according to this invention by holding the die substantially stationary and moving the glass sheet up toward it to engage the faces together. The sheet is supported at a plurality of locations underneath the die and the locations can move relative to each other and move from general coplanarity to the same shape as the lower face of the die. Thus the planar glass sheet is held on the planar upper surface of the conveyor which in one continuous stroke moves up and presses the sheet against the die, with complementary deformation of the conveyor.

In accordance with another feature of this invention the sheet is supported on a planar conveyor that is rocked about a horizontal axis to engage the faces together. This conveyor and the die can be relatively rocked about a horizontal axis, or even about two transverse horizontal axes. Similarly the conveyor can have a nonplanar upper surface to start with, as for instance by forming it of rollers of hyperboloidal shape.

It is also possible according to this invention for the die face to be annular. In this case, after the faces are entirely suctionally adhered together, a force is applied to the sheet within the annular die face to deform the sheet therewithin. This force can be applied pneumatically by forming a pressure differential across the sheet at the region within the annular die face. Thus the space within the annulus where the sheet and die are adhered together can be pressurized or depressurized. This procedure is excellent for forming goggle lenses, windshields, and the like as the central region is stretched uniformly so it will have excellent optical properties, while the border remains the right shape for holding in a frame.

It is also within the scope of this invention to deform the die after the two faces are entirely adhered together by suction. This can be done as described in the above-cited German patent document by hinging the die together so at least one region of it can flex or pivot relative to the rest of the die.

It is also possible to achieve different effects, virtual surface sculpting by varying the pressure between portions of the die face. In this manner mounting tabs and the like can be provided for, or scrap pieces of the sheet can be held with great force as marring them is not important.

The sheet according to this invention normally is supported on a conveyor and moved horizontally as it is engaged with the die. The die also can be moved horizontally synchronously with the sheet as it engages same. Usually, however, the sheet is supported on a conveyor comprised of an array of rollers rotatable about horizontal axes perpendicular to the conveyor transport direction. With this arrangement the conveyor is horizontally reciprocated while engaging the die and sheet faces with each other and while holding the die and sheet against horizontal displacement in the transport direction. Such constant movement of the rollers prevents them from marring the under surface of the sheet. For extremely gentle handling of the plastic glass sheet, the rollers are rotated jointly at the same peripheral speed to displace the sheet in the transport direction into a position under the die prior to vertical engagement of the faces with each other and thereafter they are rotated at a speed related to the conveyor reciprocation speed such that the rollers roll and do not slip on the sheet. In other words, the reciprocation speed of the roller array is independent of the rotation rate of the rollers, and the peripheral speed of the rollers is always identical to that of the workpiece.

The die according to this invention is normally wholly rigid, although it is possible to make it partially flexible as described above. Its die face is downwardly convex, at least in the systems where the conveyor and die are relatively rocked.

DESCRIPTION OF THE DRAWING

The above and other features and advantages will become more readily apparent from the following, reference being made to the accompanying drawing in which.

SPECIFIC DESCRIPTION

Figure 1:
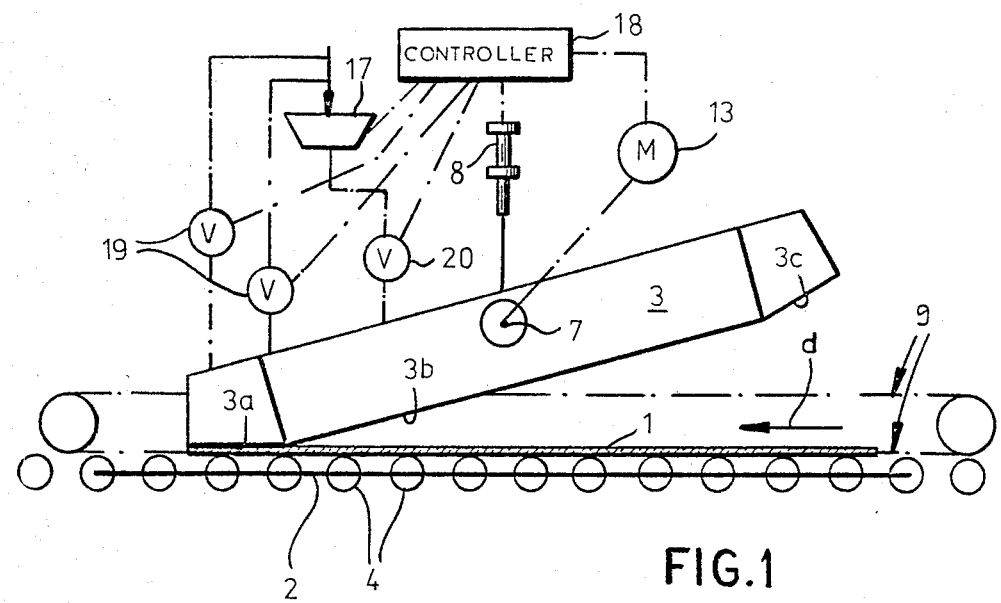
FIGS. 1, 2, and 3 are partly schematic side views illustrating the method and apparatus according to this invention respectively at the beginning, middle, and end of a single suction-forming operation.

As seen in FIGS. 1, 2, 3, 7, and 8, a normally planar glass sheet 1 is supported on a standard roller-type conveyor 2 underneath a rigid suction-forming die 3 that can be displaced vertically by a cylinder 8 and that can be rocked bout a horizontal axis 7 by a motor 13. The bottom face of the die 3 is here shown to have three flat portions 3a, 3b, and 3c that extend in planes parallel to the axis 7 but not parallel to or coplanar with each other, forming a downwardly convex bottom face 3a, 3b, 3c.

The conveyor 2 comprises a frame 14 that is horizontally reciprocal parallel to a transport direction d in a stationary guide or support 15 (FIG. 8) and that carries an array of identical cylindrical rollers 4 centered on horizontal respective axes 4A parallel to the axis 7 and perpendicular to the direction d. Each such roller 4 is associated with a respective gear 11 that meshes with teeth 12 of a toothed drive belt or chain 9 carried on sprockets 16 and driven by a motor 5. Thus this motor 5 can rotate the rollers 4 synchronously at the same peripheral speed to displace the workpiece 1 in the direction d. The partial circle TK of the sprockets 11 is identical to the roll diameter D, so that in effect the workpiece 1 will move at the same rate as the chain 9.

As is known from, for example, German patent documents Nos. K 22,178 X/39A and 2,119,699, the support 14 of the conveyor 2 is reciprocated horizontally by a motor 6 connected to it via a crank arrangement 10 to impart to it a horizontal oscillation at a speed $v_R$ which increases and decreases regularly and sinusoidally. The purpose of such oscillation is to prevent the rollers 4 from sinking up into the soft sheet 1; they are kept moving to distribute the supporting force and maintain the bottom face of the workpiece smooth.

Figure 8:
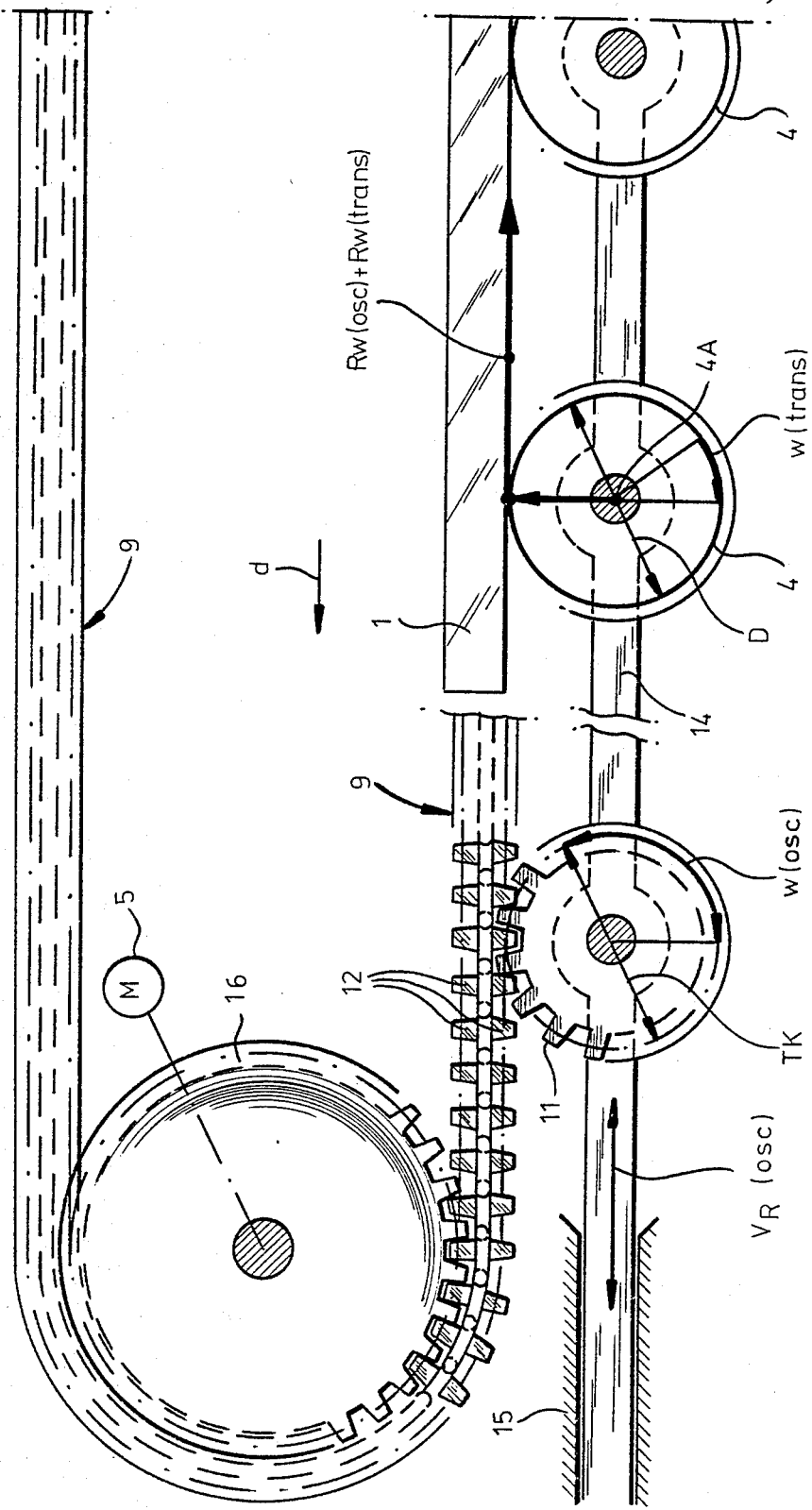
FIG. 8 is a large-scale view of a detail of the apparatus of FIG. 7.

More particularly and as shown in FIG. 8, this arrangement drives the rollers both with the angular transport speed w(trans) and the angular oscillation speed w(osc). Thus the glass sheet 1 moves relative to the conveyor frame 14 with a speed equal to the sum of the velocity component Rw(trans) created by the motor 4 and the speed Rw(osc) of the motor 6. Meanwhile the frame 14 is moving at a sinusoidally increasing and decreasing speed $v_R$(osc) which determines the angular speed w(osc) and which is complementary to the oscillation speed Rw(osc), so that $v_R(osc) = -Rw(osc)$.

Figure 2:
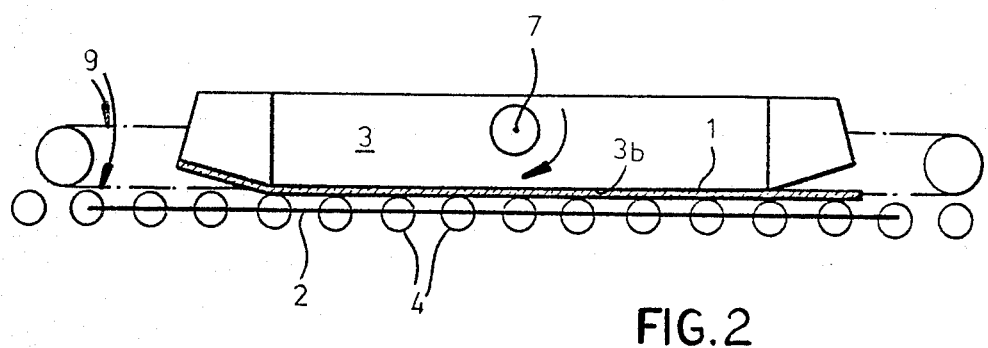
Figure 3:
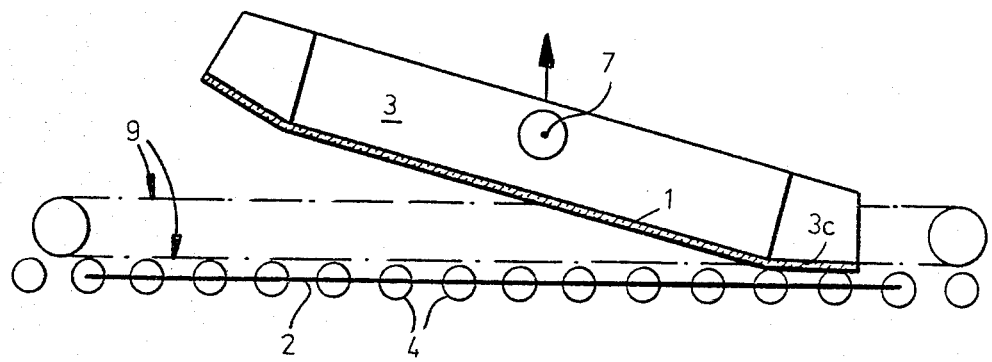

Thus as shown in FIGS. 1, 2, and 3, the workpiece 1 is first moved into position underneath the die 3, is arrested, and then the actuator 8 moves the entire die 3 down, while it is tipped, so that the portion 3a flatly lies on the sheet 1. A controller 18 is connected to a suction fan 17 and to valves 19 connected between the intake of te blower 17 and the respective die-face portions 3a. Meanwhile the conveyor 2 is reciprocating underneath the sheet 1, with the rollers 4 rolling on its surface and therefore having a peripheral speed directly related to the oscillation speed. Another valve 20 is connected between the output side of the blower 17 and the central section 3b.

In this position, therefore, the compartments at the portion 3a are evacuated so that the sheet 1 is adhered to it. Then, as shown in FIG. 2 the entire die 3 is simultaneously pivoted and lowered to press the central face portion 3b down on the sheet 1. This action bends the sheet between the portions 3a and 3b. The blower 17 is then connected to the portion 3b to adhere the sheet 1 to it.

Then as shown in FIG. 3 the die 3 is rocked further back and lifted, and its portion 3c is evacuated to engage it flatly against the sheet 1, further deforming it. The die 3 can then be lifted up while the sheet 1 cures and hardens, and the center portion 3b may be discontinued via its valve 19 from the intake of the blower 17 and connected via the valve 20 to its output to bulge out the center portion of the sheet 1, since now its ends are firmly secured at the portions 3a and 3c.

Figure 4:
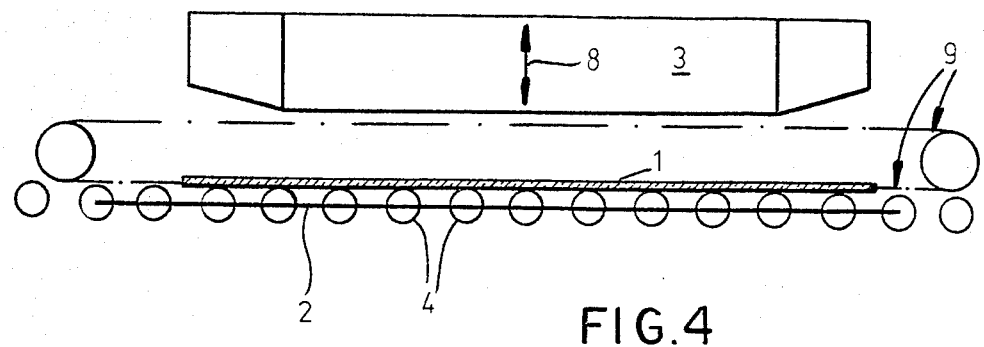
FIGS. 4 and 5 are partly schematic side views illustrating another version of the method of this invention.
Figure 5:
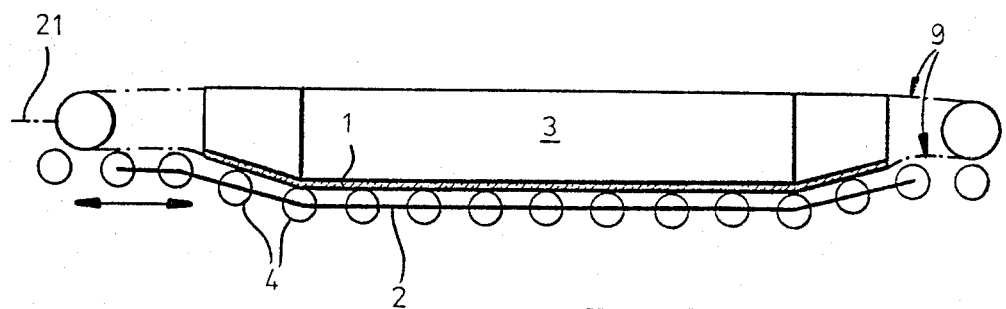

It is also possible as seen in FIGS. 4 and 5 for the rollers 4 of the conveyor 2 to be independently vertically displaceable. Thus as the die 3 is moved down from the position of FIG. 4 to that of FIG. 5 the surface defined by the conveyor 2 and holding the workpiece 1 moves from a planar one to one complementary to the die 3. Thereafter the entire die 3 can be rocked bout a longitudinal axis 21 which is horizontal and perpendicular to the pivot axis 7.

Figure 6:
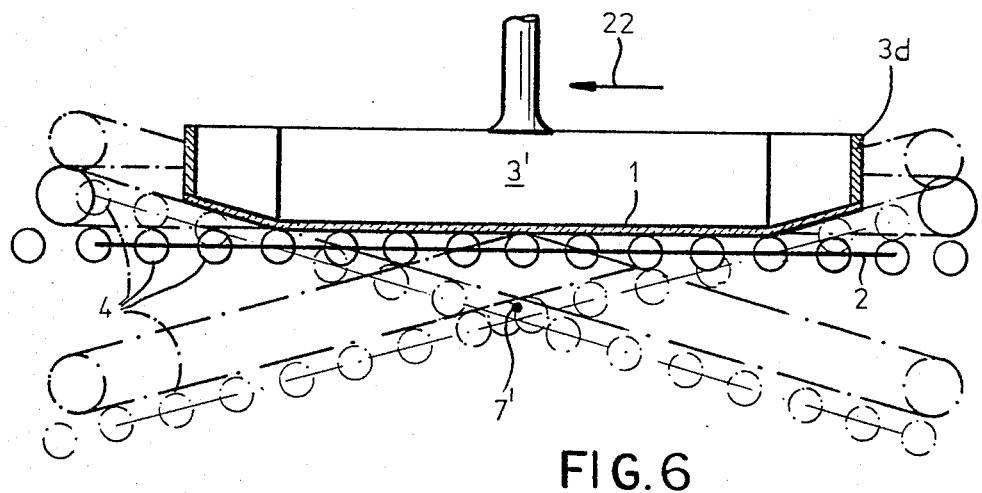
FIG. 6 is a partly schematic side view of a further style of operation in accordance with the invention.
Figure 7:
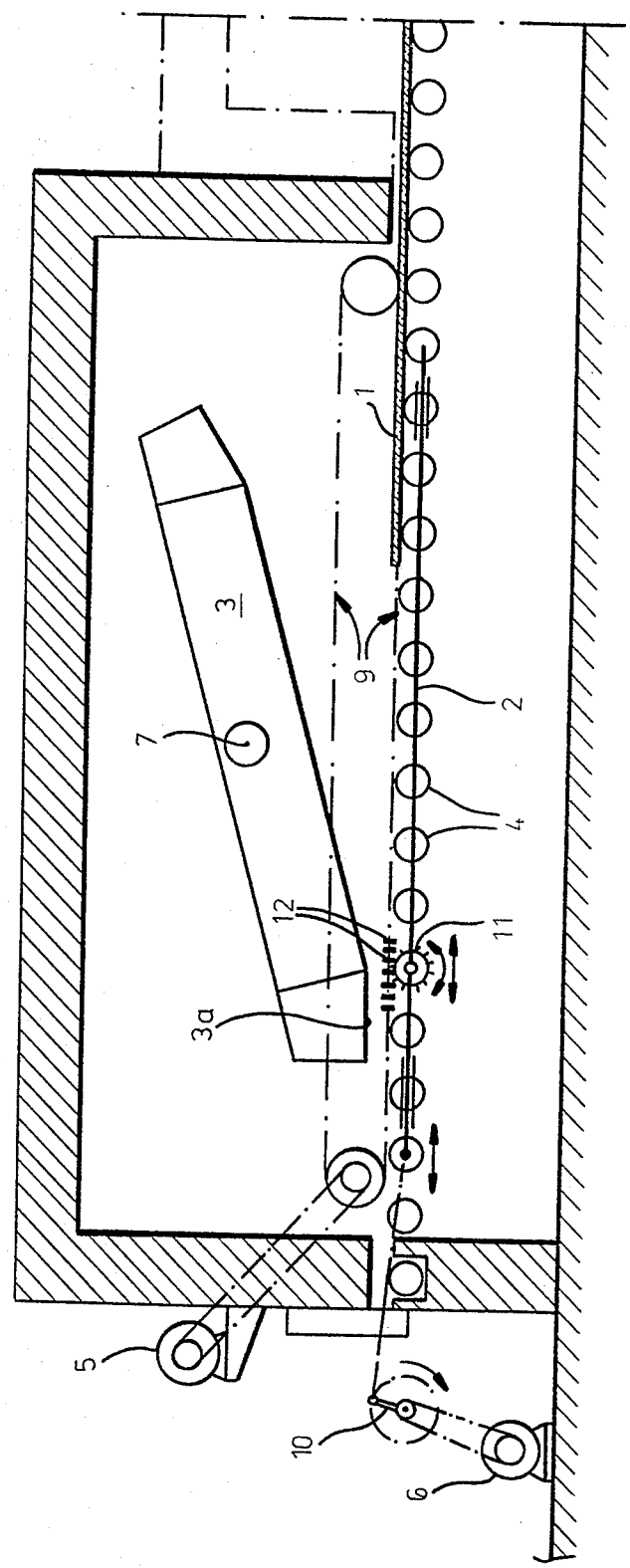
FIG. 7 is a vertical section partly in diagrammatic form illustrating the apparatus according to this invention in some detail.

In FIG. 6 an annular die 3' is used. Thus only an annular portion of the sheet 1 is adhered to it. In addition in this arrangement the conveyor 2 can be raised and lowered relative to the die 3' and rocked about a horizontal axis 7' to press the sheet 1 against the die 3'. This die 3' furthermore may move horizontally with the sheet 1 on the conveyor 2 as indicated by arrow 22. An edge portion 3d may also be hinged at 23 on the die 3' for further deformation of the sheet 1 once it is picked up. This arrangement is particularly useful for goggle lenses, windshields, and the like, as the central portion of the sheet never touches the die and remains perfectly smooth, and since gravity alone will cause the central sheet portion to hang down somewhat, stretching out any minor deformations on the underside of the sheet.

The method and apparatus of this invention are therefore capable of producing an extremely high-quality workpiece with a relatively simple piece of equipment. Shapes that hitherto have been considered impossible to make in glass at a competitive price can be produced relatively easily. In fact with the system of this invention a semispherical shape can be created simply by nutating a semispherical die about a central axis at an ever greater angle.

We claim:

1. A method of deforming a plastic glass sheet from a generally two-dimensional shape into a generally three-dimensional shape, the method comprising the steps of sequentially:
   supporting the plastic glass sheet on a conveyor with the sheet's two-dimensional upper face juxtaposed underneath the three-dimensional lower face of a vacuum-forming die;
   relatively displacing the conveyor and die vertically toward each other so that one portion of the sheet face engages a respective portion of the die face;
   securing the two portions together by suction, whereby the sheet adheres at the one portion of its face to the respective portion of the die face; and
   relatively rocking the conveyor and die about a horizontal axis with deformation of the sheet to press the rest of the sheet face and die face together and adhering the faces entirely together by suction.

2. The glass-sheet shaping method defined in claim 1 wherein the die is held substantially and the glass sheet is moved up toward it to engage the faces together.

3. The glass-sheet shaping method defined in claim 2 wherein the sheet is supported at a plurality of locations underneath the die and the locations can move relative to each other and move from general coplanarity to the same shape as the lower face of the die.

4. The glass-sheet shaping method defined in claim 2 wherein the conveyor is rocked about the horizontal axis to engage the faces together.

5. The glass-sheet shaping method defined in claim 1 wherein the die and conveyor are relatively rocked about two transverse horizontal axes.

6. The glass-sheet shaping method defined in claim 1, further comprising the step of:
   deforming the die after the two faces are entirely adhered together by suction.

7. The glass-sheet shaping method defined in claim 1 wherein the die face is subdivided into a plurality of separate portions, the method further comprising the step of:
   varying the pressure between the portions of the die face.

8. The glass-sheet shaping method defined in claim 1 wherein the sheet is supported on a conveyor and moved horizontally as it is engaged with the die, the die also being moved horizontally synchronously with the sheet as it engages same.

9. The glass-sheet shaping method defined in claim 1 wherein the sheet is supported on a conveyor comprised of an array of rollers rotatable about horizontal axes perpendicular to the conveyor transport direction, the method further comprising the step of
   horizontally reciprocating the conveyor while engaging the die and sheet faces with each other and while holding the die and sheet against horizontal displacement in the transport direction.

10. The glass-sheet shaping method defined in claim 9, further comprising the steps of:
    rotating the rollers jointly at the same peripheral speed to displace the sheet in the transport direction into a position under the die prior to vertical engagement of the faces with each other; and
    thereafter rotating the rollers at a speed related to the conveyor reciprocation speed such that the rollers roll and do not slip on the sheet.

11. A method of deforming a plastic glass sheet from a generally two-dimensional shape into a generally three-dimensional shape, the method comprising the steps of sequentially:
    supporting the plastic glass sheet with its two-dimensional upper face juxtaposed underneath the three-dimensional and annular lower face of a vacuum-forming die;
    relatively displacing the sheet and die vertically toward each other so that one portion of the sheet face engages a respective portion of the die face;
    securing the two portions together by suction, whereby the sheet adheres at the one portion of its face to the respective portion of the die face;
    relatively displacing the sheet and die with deformation of the sheet to press the rest of the sheet face and die face together and adhering the faces entirely together by suction; and
    applying a force to the sheet within the annular die face to deform the sheet therewithin.

12. The glass-sheet shaping method defined in claim 11 wherein the force is applied pneumatically by forming a pressure differential across the sheet at the region within the annular die face.

13. An apparatus for deforming a plastic glass sheet from a generally two-dimensional shape into a generally three-dimensional shape, the apparatus comprising:
    a vacuum-forming die having a downwardly directed die face;
    conveyor means for supporting the plastic glass sheet with its two-dimensional upper face juxtaposed underneath the die face; and
    means for relatively displacing the sheet and die vertically toward each other so that one portion of the sheet face engages a respective portion of the die face, for securing the two portions together by suction, and for relatively rocking the sheet and conveyor means about a horizontal axis with deformation of the sheet to press the rest of the sheet face and die face together and adhering the faces entirely together by suction.

14. The glass-sheet shaping apparatus defined in claim 13 wherein the die face is annular, the apparatus further comprising:

means for varying the air pressure within the annular die face and thereby creating a pressure differential across the sheet therewithin.

15. The glass-sheet shaping apparatus defined in claim 13 wherein the conveyor means comprises of an array of rollers rotatable about horizontal axes perpendicular to and defining a conveyor transport direction, the apparatus further comprising:

means for horizontally reciprocating the conveyor while engaging the die and sheet faces with each other and while holding the die and sheet against horizontal displacement in the transport direction.

16. The glass-sheet shaping apparatus defined in claim 15, further comprising:

means for rotating the rollers jointly at the same peripheral speed to displace the sheet in the transport direction into a position under the die prior to vertical engagement of the faces with each other and for thereafter rotating the rollers at a speed related to the conveyor reciprocation speed such that the rollers roll and do not slip on the sheet.

17. The glass-sheet shaping apparatus defined in claim 13 wherein the die is wholly rigid.

18. The glass-sheet shaping apparatus defined in claim 17 wherein the die face is downwardly convex.

19. A method of deforming a plastic glass sheet from a generally two-dimensional shape into a generally three-dimensional shape, the method comprising the steps of sequentially:

supporting the plastic glass sheet on a conveyor with the sheet's two-dimensional upper face juxtaposed underneath the three-dimensional lower face of a vacuum-forming die;

relatively displacing the sheet and die vertically toward each other so that one portion of the sheet face engages a respective portion of the die face while synchronously horizontally displacing the conveyor and die;

securing the two portions together by suction, whereby the sheet adheres at the one portion of its face to the respective portion of the die face; and relatively displacing the sheet and die with deformation of the sheet to press the rest of the sheet face and die face together and adhering the faces entirely together by suction.

* * * * *